United States Patent [19]

Maruyama et al.

[11] Patent Number: 5,412,295
[45] Date of Patent: May 2, 1995

[54] ABNORMALITY DETECTION CIRCUIT FOR A MOTOR FOR USE IN A COPIER

[75] Inventors: Kazuhisa Maruyama; Masaru Ushio; Junji Sato; Satoshi Sakata; Tomoo Kudo; Tadashi Matsudaira; Hiroyuki Watanabe; Yoshikazu Maekawa, all of Tokyo, Japan

[73] Assignee: Konica Corporation, Tokyo, Japan

[21] Appl. No.: 138,357

[22] Filed: Oct. 18, 1993

[30] Foreign Application Priority Data

Oct. 23, 1992 [JP] Japan ................................ 4-309641
Nov. 6, 1992 [JP] Japan ................................ 4-322568
Nov. 9, 1992 [JP] Japan ................................ 4-323687

[51] Int. Cl.$^6$ ............................................ H02K 17/32
[52] U.S. Cl. ............................. 318/434; 318/798; 318/799; 318/805
[58] Field of Search ................ 318/434, 798, 799, 805

[56] References Cited

U.S. PATENT DOCUMENTS

| | | | |
|---|---|---|---|
| 4,641,067 | 2/1987 | Iizawa et al. | 318/434 |
| 5,225,751 | 7/1993 | Kusano et al. | 318/434 |
| 5,241,255 | 8/1993 | Oshima et al. | 318/434 |
| 5,303,156 | 4/1994 | Matsuoka et al. | 318/434 |

Primary Examiner—William M. Shoop, Jr.
Assistant Examiner—Karen Masih
Attorney, Agent, or Firm—Frishauf, Holtz, Goodman & Woodward

[57] ABSTRACT

An electric circuit provided with an abnormal condition detector for a motor, for use in a toner image forming apparatus, includes a current detection circuit for detecting a presence of a current when a power supply circuit is switched OFF; a test circuit for confirming a line connection between a control circuit and a switch by transmitting a test signal between the control circuit and the switch and a control circuit for determining an abnormal section causing an abnormal condition of a motor.

10 Claims, 9 Drawing Sheets

ABNORMALITY DETECTION CIRCUIT FOR A MOTOR FOR USE IN A COPIER

BACKGROUND OF THE INVENTION

The present invention relates to an abnormality detection circuit for a motor in which causes of abnormality of the motor can be precisely specified.

Although, in many cases, the motor is used for an electronic device or a control device, the motor can not be rotated and operated normally when the abnormality occurs in a driving circuit of the motor. For example, when the abnormality occurs in the driving circuit of a copying sheet conveyance motor in an electrophotographic copier (hereinafter, which will be called a copier), the copying sheet can not be conveyed.

Conventionally, whether the motor is rotated or not, can be easily detected from an output of an encoder provided on a rotational shaft of the motor. However, as a result, even when it is detected that the motor is not rotated, the cause of abnormality can not be detected, and therefore, a display showing an error is simply shown.

In the case of the copier, users require a serviceman to repair the copier when an error massage is displayed. However, the serviceman can not specify only from the message which portion of the copier is defective, and accordingly, he should carry various parts for replacement such as a power circuit of a motor, a printed circuit board for driving, or a motor. Usually, a method is used in which a part, which is likely defective, is successively replaced with a new one in the manner that, at first, the power circuit of the motor is inspected, and next, the printed circuit board for driving is replaced with new one.

However, a large part of the repairing operation is conducted depending on experience and intuition of the serviceman, and in the case of a serviceman, whose experience is small, the repairing operation can not be smoothly conducted, and repair parts losses are large.

In view of the foregoing, the first object of the present invention is to specify precisely the cause of abnormality when the abnormality occurs in a portion including the motor, and to cope with the abnormality quickly and accurately.

Further, the second object of the present invention is to judge whether the cause of abnormality is included in the motor itself, or if a motor drive element is defective, when the motor is not rotated, and to cope with the abnormality quickly and accurately.

Further, the present invention relates to an abnormality detection device of rotation speed of a motor which is used for an electrophotographic copier or the like.

There are many electronic devices and industrial devices for which motors are used. Various methods for detecting the rotational speed of the motor are widely known, and a method in which a rotary encoder is used is among them. The method is a method in which a disc, which is called a rotary encoder, having a large number of slits is provided on the rotational shaft of the motor; passage of light through the slits of the disc, which is rotated, is optically detected and converted into electric pulses; and the rotational speed of the motor is detected from the number of pulses per a unit period of time.

Conventionally, in order to detect abnormality of the rotational speed of the motor, a method is known in which a clock signal having a high frequency is generated on the one hand; and a variation of the clock signals corresponding to one pulse of a group of pulses is obtained from the rotary encoder.

In a copier, when an image formed on a photoreceptor on a rotational drum is transferred onto a copying sheet, the copying sheet fed from a cassette is stopped once and stands-by at the place in order to make a fore end of the image coincide with that of the copying sheet, and the copying sheet is fed again in timed relation with the movement of the image. In order to conduct the above described operation, a mechanism is used in which a clutch is operated once, and a feeding motor which is always rotated, is stopped once. In the above described case, in the method in which the abnormality of the rotational speed of the motor is detected by a variation of the number of clock pulses, the case where the rotational speed of the motor is decreased when the clutch is operated is judged as the abnormal speed, which is a problem.

Accordingly, in Japanese Patent Publication Open to Public Inspection No. 59323/1986, a control method for abnormal speed of a motor has been proposed in which: a driving-current of the motor is marked and whether the driving current is abnormal or not, is checked; when the driving current is abnormal and the abnormal condition is continued for a longer period of time than a predetermined period of time, or the abnormal condition occurs predetermined times, it is judged that the motor speed is abnormal; and the rotation of the motor is gradually stopped.

Due to the foregoing method, because the clutch is instantaneously operated, the decrease of the rotational speed by the clutch operation is not erroneously detected as abnormal speed. However, a counter to detect that an abnormal current is continued for a predetermined period of time, is necessary. Further, because it takes a long period of time until the current is judged to be abnormal, the correspondence to the next operation by which the motor is stopped, or the abnormality is displayed, is likely to be late.

A control method, in which a PI (proportional plus integral) action is used, is widely known as a motor speed control method. The control method using the PI action is a control method in which a speed command signal to control the rotational speed of the motor is caused to be a sum of a controlled variable (proportional term) which is proportional to a difference between a target rotational speed $V_S$ and an actual rotational speed V and a controlled variable (integral term) which is proportional to a time integral of the difference. Giving consideration to the integral term of the speed command signal used in the PI action control, it can be found that an amount of variation of the integral term is remarkably different for an instantaneous decrease of the rotation speed of the motor caused by the clutch operation when compared with the case of a speed variation caused by an abnormality of the actual speed.

Accordingly, the third object of the present invention is to detect an abnormality of the rotation speed of the motor by a simple circuit without using a counter or the like in the speed control of the motor which is operated in accordance with the PI action.

SUMMARY OF THE INVENTION

In order to accomplish the first object of the present invention, a motor abnormality detection circuit comprises: an energizing circuit to energize a motor; a switching means to turn ON/OFF energizing a current to the motor; an OFF time current detection means to detect an existence of the current flowing in the energizing circuit at a position close to a power source of the energizing circuit when energizing to the motor is turned OFF by the energizing switching means; an energizing command means to command the energizing switching means to turn energizing ON/OFF; a connection confirming means to confirm the connection of the energizing command means with the energizing switching means when an test signal is returned from the energizing command means; and an abnormality judging means to judge an abnormal portion according to an output from the OFF time current detection means and the connection confirming means.

Further, it is preferable that the abnormality judging means comprises: at least one of a voltage detection means to detect an voltage at a predetermined point located at the opposite side to a power source side of a fuse in the current energizing circuit, a pulse signal confirming means to confirm that a motor driving pulse signal is outputted from the energizing command means to the energizing switching means when the pulse signal is returned, and an ON time current detection means to detect the existence of a current in the current flow circuit when current energizing to the motor is turned ON by the energizing switching circuit; or at least both of the OFF time voltage detection means to detect the voltage of the power source in the current energizing circuit when current flow to the motor is turned OFF by the energizing switching means, and an OFF time load detection means to detect a load of the power source in the current energizing circuit when current energizing to a motor is turned OFF by the energizing switching means; and further, both of an ON time voltage detection means to detect the voltage of the power source of the current energizing circuit when current energizing to the motor is turned ON by the energizing switching means, and an ON time load detection means to detect the load of the power source in the current energizing circuit when current energizing to the motor is turned ON by the energizing switching means, and that an abnormality judging means judges the abnormal portion according to an output from any of the voltage detection means, the pulse signal detection means, the ON time current detection means, the OFF time voltage detection means and the OFF time load detection means, and the ON time voltage detection means and ON time load detection means.

When abnormality occurs in the motor circuit, the abnormality judging means can specify a faulty portion in which causes of abnormality exist, according to an output from the OFF time current detection means and the connection confirming means, due to the foregoing composition of the present invention.

Further, when the abnormality judging means is provided with the voltage detection means, the pulse signal confirming means, the ON time current detection means, the OFF time voltage detection means, the OFF time load detection means, the ON time voltage detection means, and the ON time load detection means, the causes of abnormality can be specified in more detail.

In order to accomplish the second object of the present invention, a motor abnormality detection circuit comprises: an energizing circuit to energize a current to a motor; a energizing switching circuit which is connected with the power source side in the energizing circuit with respect to the motor, and turns energizing a current to the motor ON/OFF; a voltage detection circuit to detect the voltage across the energizing switching means in the energizing circuit and the motor; and an abnormality judging means to judge that abnormality occurs in the motor, or in a motor driving printed circuit board according to the ON/OFF condition of current energizing by the energizing switching means and an output of the voltage detection means.

Due to the foregoing composition of the present invention, when the motor is not rotated although the motor is energized by a current by the energizing switching means, it can be judged whether the motor is faulty, or a motor driving element is abnormal according to an output from the voltage detection means by the abnormality detection means.

In order to accomplish the foregoing third object of the present invention, a rotational speed detection means to detect a rotational speed of the motor; a speed command output means to calculate and output a motor speed command signal based on a predetermined calculation formula in a PI action according to a detected rotational speed and a target rotational speed; and an abnormal speed judging means to judge that the rotational speed of the motor is abnormal when the value of the integral term of the speed command signal is larger than a predetermined upper threshold value, or smaller than a predetermined lower threshold value, are provided.

When the value of the integral term of the speed command signal calculated by a predetermined calculation formula in the PI action is lager than a predetermined upper threshold value, or smaller than a predetermined lower threshold value, it is judged that the rotational speed of the motor is abnormal.

BRIEF DESCRIPTION OF THE DRAWINGS

FIGS. 8A, 8B, and 8C are illustrative views to explain a conception of abnormal speed detection of the motor according to the present invention.

DETAILED DESCRIPTION OF THE PREFERRED EMBODIMENT

Referring to drawings, the present invention will be described as follows.

Figure 2:
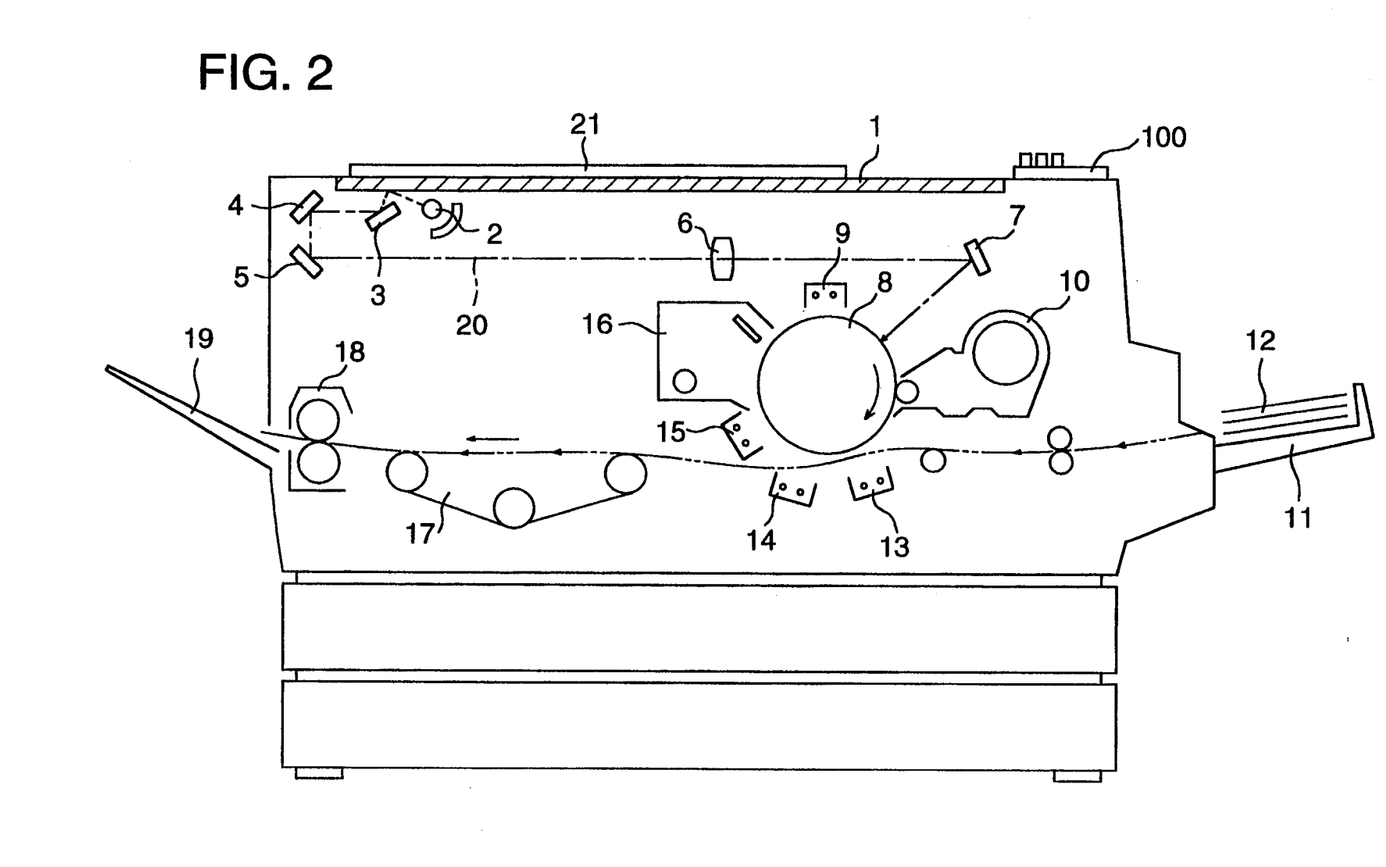
FIG. 2 is a view showing an outline structure of a copier to which the abnormality detection circuit of the motor according to the present invention is applied.

FIG. 2 shows an outline structure of a copier to which an abnormality detection circuit of a motor according to the present invention is applied.

When a start of a copying operation is commanded after a power source button on a operation panel 100 provided on the upper surface of a copier main body has been pressed to turn ON the copier, the following operations are carried out. A document 21 placed on a platen glass 1 is illuminated by an illumination lamp 2; a reflection light 20 (shown by a one-dotted chain line) from the document 21 is reflected by the first mirror 3, the second mirror 4, and the third mirror 5, and passes through a lens 6; the light beam is reflected by the fourth mirror 7 and projected on a photoreceptor drum 8; and an electrostatic latent image of the document 21 is formed on the drum 8. The following units are respectively arranged in the periphery of the drum 8: a charging electrode 9 to uniformly charge a photoreceptor provided on the surface of the drum 8; developing units 10 to develop the electrostatic latent image formed on the photoreceptor into a visual image (toner image); a transfer electrode 13 to transfer the visual image onto a copying sheet 12 fed from a sheet feed cassette 11 through a path shown by a two-dotted chain line; a separation electrode to separate the copying sheet 12, onto which the visual image has been transferred, from the drum 8; a discharging electrode 15 to discharge a remaining charge on the photoreceptor; and a cleaning unit 16 to remove a remaining toner on the photoreceptor after discharging.

The copying sheet 12 separated from the drum 8 after passing through the path shown by the two-dotted chain line after transferring is conveyed to a fixing unit 18 by a conveyance roller 17, a toner on the copying sheet 12 is thermally fused there and fixed to the copying sheet 12, and the copying sheet is discharged onto a discharging tray 19.

In the above described copier, the abnormality detection circuit of the motor according to the present invention is applied to, for example, a motor to travel an optical scanning system including the illumination lamp 2, and a motor to rotate the photoreceptor drum 8.

Figure 1:
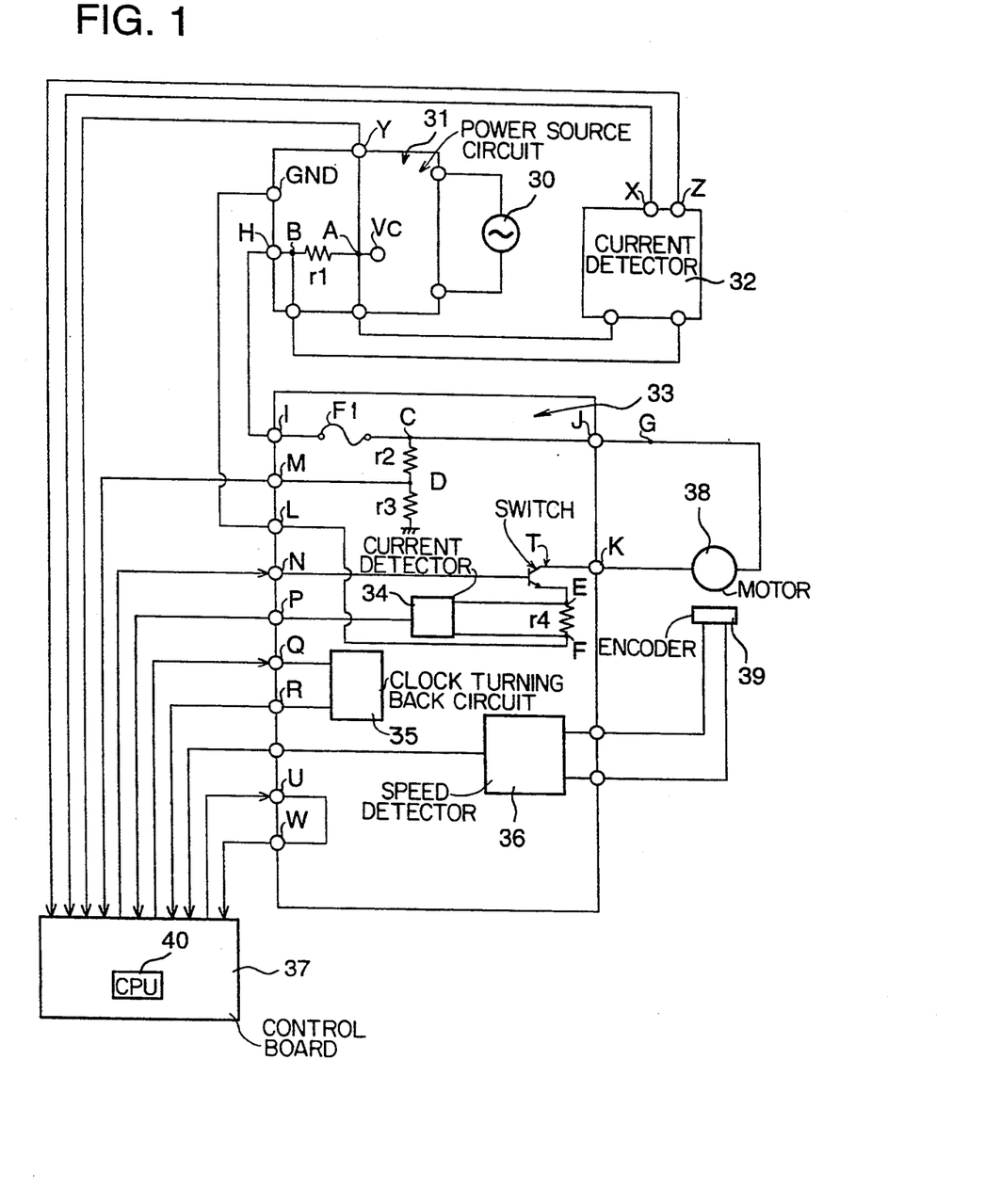
FIG. 1 is an electric connection diagram of an example of an abnormality detection circuit of a motor according to the present invention.

Next, an electric connection diagram of the abnormality detection circuit of the motor according to the present invention is shown in FIG. 1.

A voltage of an AC power source is AC 100 [V], and numeral 31 is a circuit of a DC motor power source in which the AC voltage from the AC power source is converted into a DC voltage, and a DC voltage $V_C$ (for example, 28 [V]) to drive a motor 38, which, for example, moves the optical scanning system including the illumination lamp 2 shown in FIG. 2, is generated. Numeral 32 is a current detector to detect the existence of a current and an over load on the power source by detecting the voltage difference across a point A and a point B in the DC motor power circuit 31, and the detection result is notified to a CPU 40 in a control board 37.

Numeral 33 is a motor driving printed circuit board to drive the motor 38. On the motor driving printed circuit board 33, a fuse F to prevent an over current from flowing into the motor 38, a switching transistor T to turn ON/OFF energizing current to the motor 38, a current detector 34 to detect an emitter current of the transistor T by detecting the voltage difference across a point E and a point F, a clock turning back circuit 35 to turn back a clock signal received from the control board 37 as it is and to transmit it, and a motor rotation speed detector 36 to output a rotation speed signal of the motor according to an output of an encoder 39 to detect the rotation speed of the motor 38, are provided. A terminal C in the motor driving printed circuit board 33 is connected to ground through resistors r2 and r3. In this case, a synthesized resistance value of the resistors r2 and r3 is selected so that the resistance value is so large as to approximately prevent a leak current flowing from the terminal C to the ground.

When the power button provided on the operation panel 100 which is provided on the upper surface of the copier main body shown in FIG. 2 is pressed to turn ON the copier, the preparation for copying is completed and the copier is ready for a copying operation. The motor 38 for driving the optical scanning system is driven when a voltage is impressed on a base of the transistor T, and a collector and an emitter are electrically communicated, and thereby, a closed loop circuit is formed from a supplying terminal of the DC voltage $V_C$ of the DC motor power circuit 31 to a terminal H, a terminal I of the motor driving printed circuit board 33, a fuse F1, a terminal J, the motor 38, a terminal K of the motor driving printed circuit board 33, the collector and emitter of the transistor T, a terminal L of the motor driving printed circuit board 33, and GND of the DC motor power circuit 31.

Next, using flow charts shown in FIG. 3, FIG. 4, and FIG. 5, a processing operation of the abnormality detection circuit of the motor according to the present invention will be described as follows.

Figure 3:
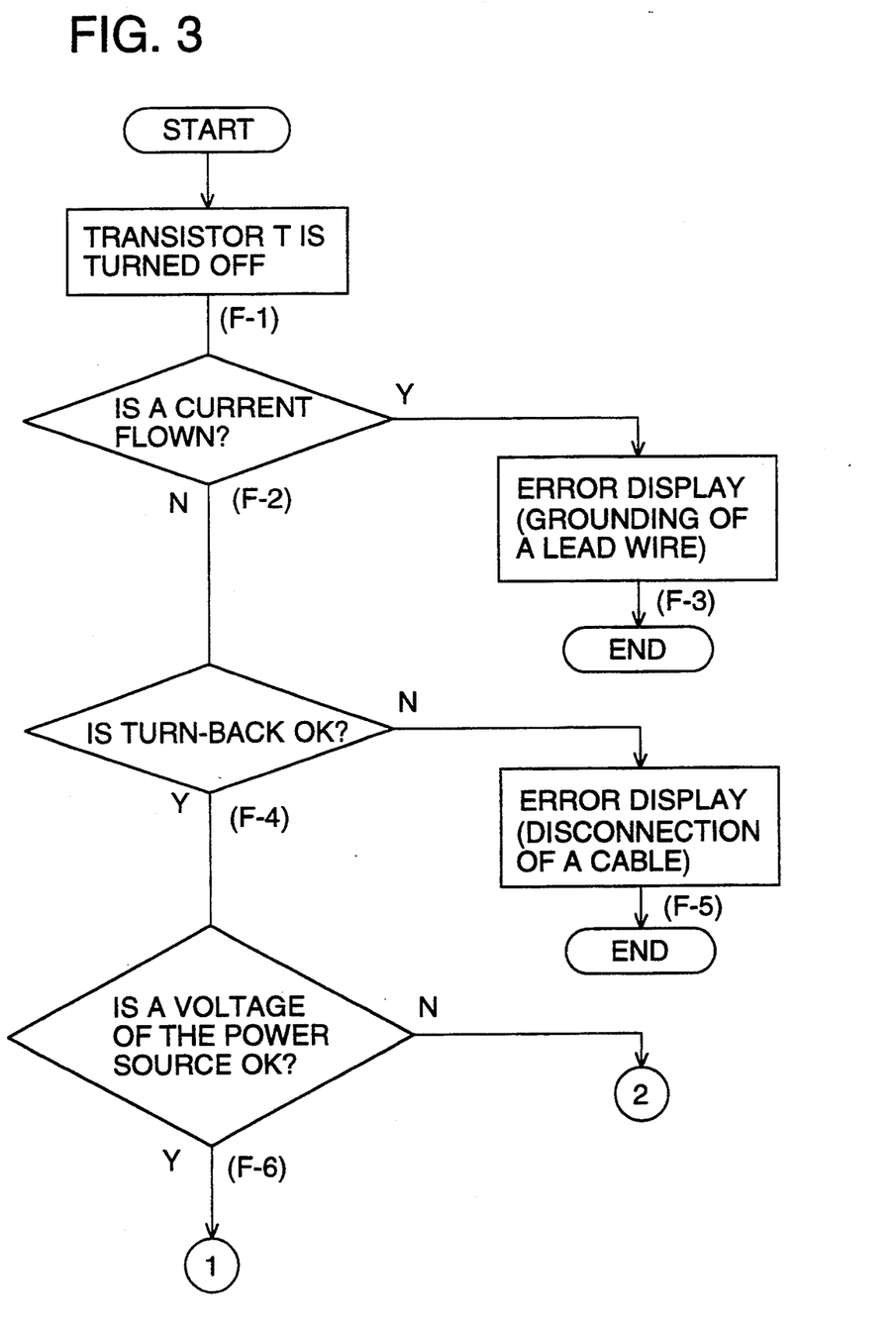
FIG. 3 is a portion of a flow chart showing processing for specifying the cause of abnormality by the abnormality detection circuit of the motor according to the present invention.

When it is detected by the encoder 39 and the motor rotation speed detector 36 that the motor 38 for driving the optical scanning system is not rotated during copy processing, and it is notified to the CPU 40, the control board 37 stops voltage impressing on the base of the transistor T through a terminal N of the motor driving printed circuit board 33 in step (F-1) in FIG. 3 and turns OFF the transistor T. Then, the current detector 32 detects the voltage difference across the point A and the point B in the DC motor power circuit 31, and notifies the CPU 40 of the existence of the current flowing from the power source through a terminal X of the current detector 32 (F-2).

When the current flows, it is considered that the motor 38 is not rotated because, for example, a lead wire connecting a terminal J of the motor driving printed circuit board 33 with the motor 38 is grounded at a point G and the electric power is not supplied to the motor 38. Therefore, it is displayed on a display unit on the operation panel 100 (shown in FIG. 2) of the copier (F-3), and the processing is completed.

When the current is not flowing between the point A and the point B, a predetermined data such as a test signal, is transmitted from the control board 37 to a terminal U of the motor driving printed circuit board 33, and is turned back in the motor driving printed circuit board 33 and the same data is sent back from a terminal W of the motor driving printed circuit board 33 to the control board 37 (F-4) in order to check and confirm that the motor 38 is not rotated because the control board is not correctly connected with the motor driving printed circuit board 33 and thereby, the ON signal is not supplied to the base of the transistor T.

When the same data as the data which is sent from the control board 37 to the terminal U of the motor driving printed circuit board 33 in the check in step (F-4), is not sent back from the terminal W of the motor driving printed circuit board 33 to the control board 37, it can be considered that a connector of a cable which connects the control board 37 with the motor driving printed circuit board 33 is disconnected. Therefore, the occurrence of disconnection is displayed on the display unit on the operation panel 100 (shown in FIG. 2) of the copier (F-5), and the processing is completed.

As a result of the check in (F-4), when the data has been sent back and the connection is correct, next, the DC voltage $V_C$ at the point A at which the AC voltage is converted into the DC voltage in the DC motor power circuit 31, is checked through a terminal Y (F-6).

Figure 4:
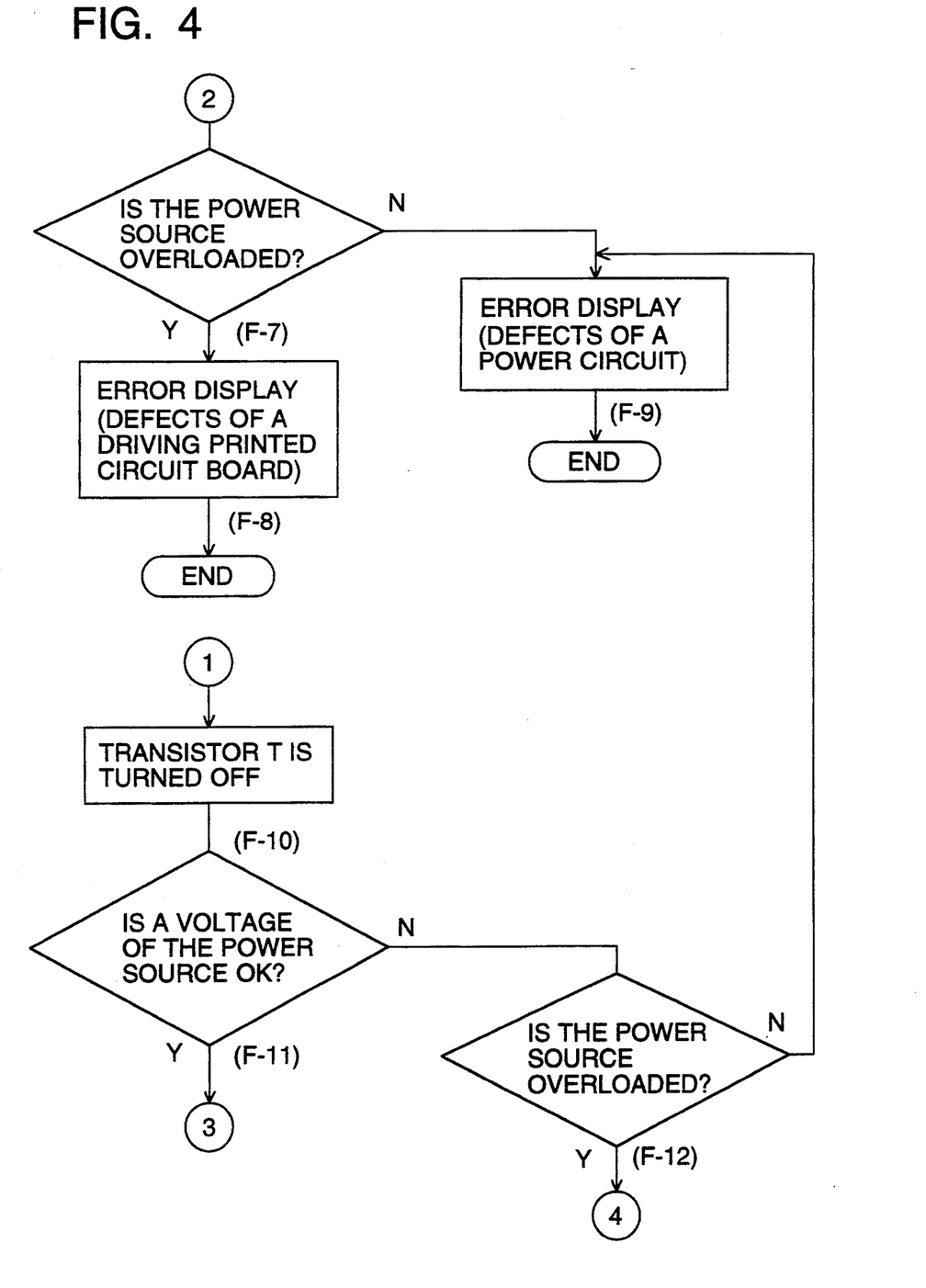
FIG. 4 is a subsequent portion to FIG. 3 of the flow chart showing processing for specifying of the cause of abnormality by the abnormality detection circuit of the motor according to the present invention.

When the DC voltage $V_C$ at the point A in the DC motor power circuit 31 is not a regular value (for example, 28 [V]), the sequence advances to step (F-7) in FIG. 4, and it is checked through a terminal Z of the current detector 32 whether the power source is overloaded or not.

When the power source is not overloaded, it is considered that the DC motor power supply circuit means 31 is abnormal. Then, the occurrence of the abnormality is displayed on the display unit on the operation panel 100 (shown in FIG. 2) of the copier (F-9), and the processing is completed.

When it is found in the check in step (F-7) that the power source is overloaded, it can be considered that a short-circuit has occurred in the motor driving printed circuit board 33. Accordingly, the occurrence of short-circuit is displayed on the display unit on the operation panel 100 (shown in FIG. 2) of the copier (F-8), and the processing is completed.

As a result of the check in step (F-6) in FIG. 3, when the DC voltage $V_C$ at the point A in the DC motor power circuit 31 has been a regular value, the sequence advances to step (F-10) in FIG. 4, and the voltage is impressed upon the base of the transistor T through the terminal N of the motor driving printed circuit board 33 from the control board 37 and the transistor T is turned ON. The voltage of the power source is checked in the same manner as that in the step (F-6) in FIG. 3 (F-11).

When the DC voltage $V_C$ at the point A in the DC motor power circuit 31 is not a regular value, the sequence advances to step (F-12), and it is checked through the terminal Z of the current detector 32 whether the power source is overloaded.

When the power source is not overloaded, it is considered that the DC motor power circuit 31 is abnormal. Then, the occurrence of the abnormality in the circuit 31 is displayed on the display unit on the operation panel 100 (shown in FIG. 2) of the copier (F-9), and the processing is completed.

Figure 5:
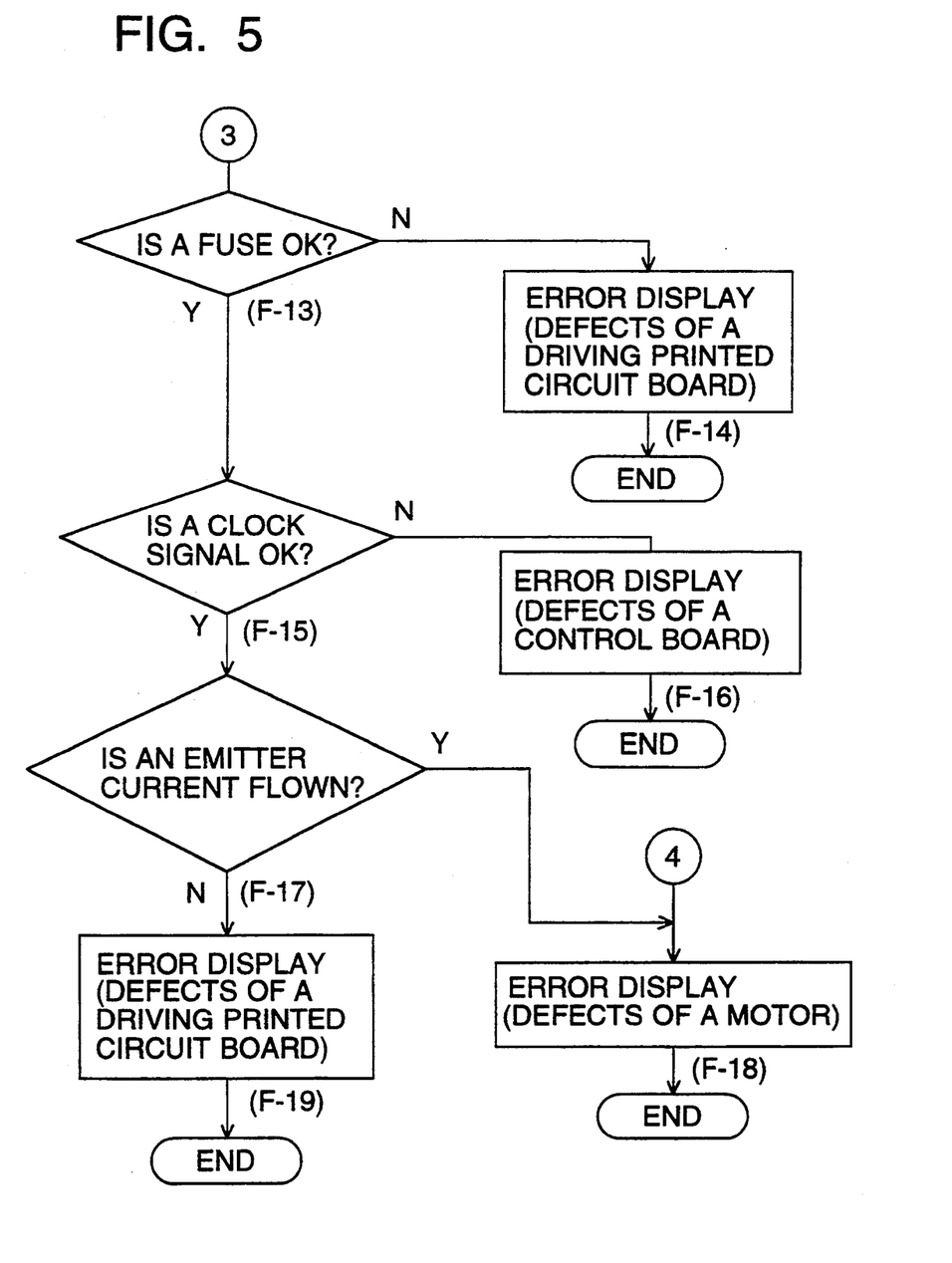
FIG. 5 is a subsequent portion to FIG. 4 of a flow chart showing processing for specifying the cause of abnormality by the abnormality detection circuit of the motor according to the present invention.

When it has been found in the check in step (F-12) that the power source is overloaded, it is considered that a short-circuit has occurred in the motor 38, and the sequence advances to step (F-18) in FIG. 5. Then, it is displayed on the display unit on the operation panel 100 (shown in FIG. 2) that the motor is faulty, and the processing is completed.

When the DC voltage $V_C$ at the point A is a regular value in the check in step (F-12), the sequence advances to step (F-13) in FIG. 5, and the voltage at the point D in the motor driving printed circuit board 33 is checked through the terminal M. This comes from the reason why the voltage is not impressed upon the point D when the fuse F1 has been blown, and the voltage of the point D is 0 [V]. The foregoing is utilized for the check whether the fuse F1 is blown or not. When the voltage at the point D is 0[V], it is considered that the fuse F1 is blown. Then, it is displayed on the display unit on the operation panel 100 (shown in FIG. 2) of the copier that the motor driving printed circuit board 33 is abnormal (F-14), and the processing is completed. In this case, "Defect of fuse F1" is not displayed, but "Abnormality of motor driving printed circuit board 33" is displayed in the display unit on the operation panel 100. The reason is described as follows:

The over current that has blown the fuse F1 is attributed to the motor driving printed circuit board 33. Therefore, in order to take measures against the problem, it is not sufficient to replace only the fuse F.

When the voltage at the point D is normal, it is checked whether a clock signal as a pulse signal is correctly sent from the control board 37 to the motor driving printed circuit board 33 (F-15). The clock signal is supplied from the control board 37 to a terminal Q of the motor driving printed circuit board 33, turned back in the clock turning-back circuit 35, and is sent back to the control board 37 through a terminal R. When the clock signal is abnormal, the abnormality of the control board 37 is displayed on the display unit on the operation panel 100 (shown in FIG. 2) of the copier (F-16), and the processing is completed.

When the clock signal is not abnormal, the voltage difference across the point E and the point F in the motor driving printed circuit board 33 is detected by the current detector 34, and the existence of the emitter current of the transistor T is checked through a terminal P of the motor driving printed circuit board 33 (F-17).

When the emitter current of the transistor is flowing, it is considered that the motor 38 is not rotated although the current is energized to the motor 38, so that the motor 38 itself is defective. Therefore, the abnormality of the motor is displayed on the display unit on the operation panel 100 (shown in FIG. 2) of the copier (F-18), and the processing is completed. On the contrary, when the emitter current of the transistor is flowing, it is considered that the motor driving printed circuit board 33 is abnormal. Therefore, the occurrence of the abnormality in the circuit board 33 is displayed on the display unit on the operation panel 100 (shown in FIG. 2) of the copier (F-19), and the processing is completed.

As described above, the causes of abnormality concerning the motor according to the present invention can be specified as follows:

(1) Grounding of the lead wire (F-3)
(2) Disconnection of the cable which connects the control board with the motor driving printed circuit board (F-5)
(3) Faults in the power circuit (F-9)
(4) Faults in the motor driving printed circuit board (F-8, F-14, F-19)
(5) Faults in the control board (F-16)
(6) Faults of the motor (F-18).

Although the case where the motor is not rotated has been described in the example, the present invention is not limited to the specific example, but of course, causes can be also specified in the case where the rotation speed of the motor detected by the encoder is lower than a predetermined speed.

As described above, according to the present invention, the causes of abnormality, that is, which part is defective, can be specified when the motor is defective. Accordingly, when the causes of abnormality are displayed, users can report the causes to the serviceman. Thereby, the faults can be appropriately and quickly recovered, the repair time can be greatly shortened, and losses of the repair parts can be greatly reduced.

Further, according to the present invention, because specifying processing of the causes of abnormality of the motor is not carried out at the time of the normal operation, but it is carried out only when the motor is defective, a load of the CPU at the time of normal operation is not increased.

Figure 6:
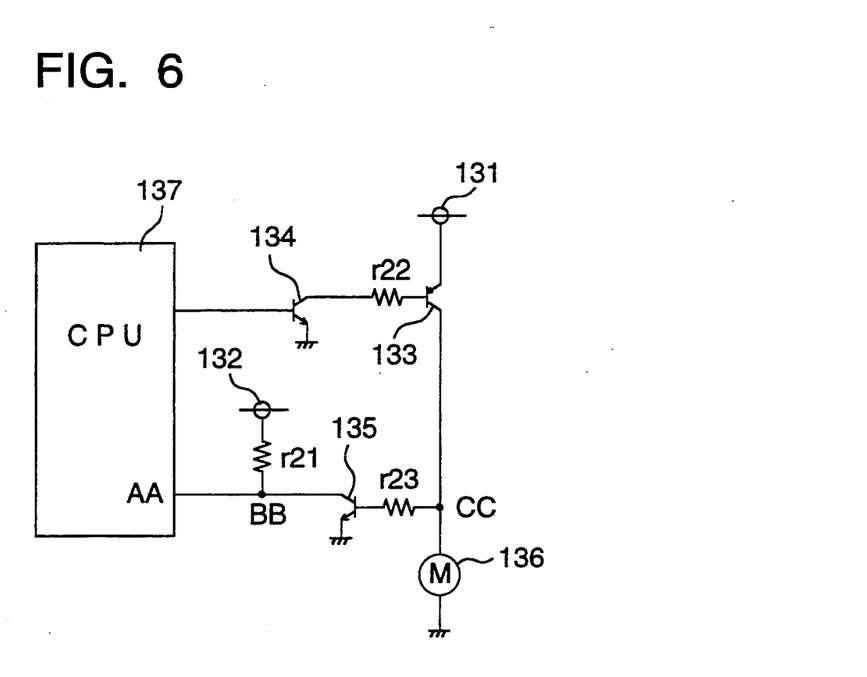
FIG. 6 is an electric connection diagram of an example of an abnormality detection circuit of the motor according to the present invention.

Next, an electric connection diagram of an example, in which an abnormality detection circuit of the motor to accomplish the second object of the present invention is applied to the abnormality detection of the motor to rotate the photoreceptor drum 8 shown in FIG. 2, is shown in FIG. 6.

Numeral 131 is a DC power source for driving the motor, and for example, the voltage is about 30 [V]. A transistor 133 which is operated as a switch for driving the motor is connected between the DC power source 131 and a motor 136. A base terminal of the transistor 133 is connected with a collector terminal of a transistor 134 through a resistor r22, and a base terminal of the transistor 134 is connected with a CPU 137. In this case, a resistor of approximately 2 [KΩ] is used for the resistor r22. When the transistor 133 is turned ON, the DC power source 131 energizes a current to the motor 136, and the motor 136 is rotated. In this example, motor drive elements are transistors 133 and 134.

A base terminal of a transistor 135 is connected with a point CC located between the transistor 133 and the motor 136 through a resistor r23, and a collector terminal of the transistor 135 is connected with a CPU 137. Here, for the resistor r23, a resistor of high resistance (for example, 500 [KΩ]) is used so that a current flowing from the DC power source 131 to the transistor 133, point CC, resistor r23, emitter terminal of the transistor 135, and the ground is small. For example, the power source of 5 [V] is used for a DC power source 132, and the power source 132 is connected with the collector terminal of the transistor 135 through the resistor r21 at a point BB.

When the CPU 137 outputs a high signal to the base terminal of the transistor 134, the transistor 134 is turned on, and thereby the transistor 133 is turned off. As a result, the DC power source 131 does not energize a current to the motor 136, and the motor 136 is not rotated. At this time, the voltage of the point CC is 0 [V], and the transistor 135 is turned off. Accordingly, the voltage of the DC power source 132 is impressed upon the input terminal AA of the CPU 137 through the point BB as it is.

On the other hand, when the CPU 137 outputs a low signal to the base terminal of the transistor 134, the transistor 134 is turned off, and the transistor 133 is turned on. As a result, the DC power source 131 energizes a current to the motor 136, and the motor 136 is rotated. At this time, the voltage of the point CC is equal to that of the DC power source (for example, 30 [V]), and the transistor 135 is turned on. Accordingly, the current flows from the DC power source 132 to the ground through r21, the point BB, and the transistor 135. Therefore, the voltage of the point BB is 0 [V], and the voltage of the input terminal AA of the CPU 137 is a ground potential.

In this connection, when it is detected by the encoder which is not shown in drawings that the motor 136 to rotate the photoreceptor drum 108 shown in FIG. 2 is not rotated although the CPU 137 outputs a low signal to the base terminal of the transistor 134, a signal to the input terminal AA is checked.

When the potential of the input terminal AA is high, the voltage at the point CC is 0 [V]. Accordingly, the causes in which the motor 136 is not rotated are attributed to that the transistors 133 or 134 is not turned on, that is, the drive elements are faulty.

In contrast to the foregoing, when the potential of the input terminal AA of the CPU 137 is 0 [V], the voltage is impressed upon the point CC. Accordingly, the transistors 133 and 134 are normal, and the causes in which the motor is not rotated are attributed to the fault of the motor 136.

As described above, according to the present invention, when the potential of the input terminal AA of the CPU 137 is checked, it can be discriminated that the causes in which the motor 136 is not rotated are attributed to faults of the drive elements, that is, transistors 133 or 134, or the motor itself.

In this example, although transistors 133 and 134 are used for drive elements (switches to drive the motor), the present invention is not limited to the foregoing, but it can be also applied to the case in which relays are used for drive elements of the motor.

Further, of course, an abnormality detection circuit of the motor according to the present invention can be applied to not only a motor of a copier, but also motors for use in various devices.

As described above, according to the present invention, when the motor is not rotated, it can be discriminated that the motor is faulty, or motor drive elements are abnormal. Accordingly, when the causes of abnormality are displayed, users can notify the causes of abnormality to a serviceman. Therefore, the faults can be appropriately and quickly recovered, a period of the repair time is greatly shortened, and losses of repair parts can be reduced.

Referring to the drawings, the present invention will be described as follows.

Figure 7:
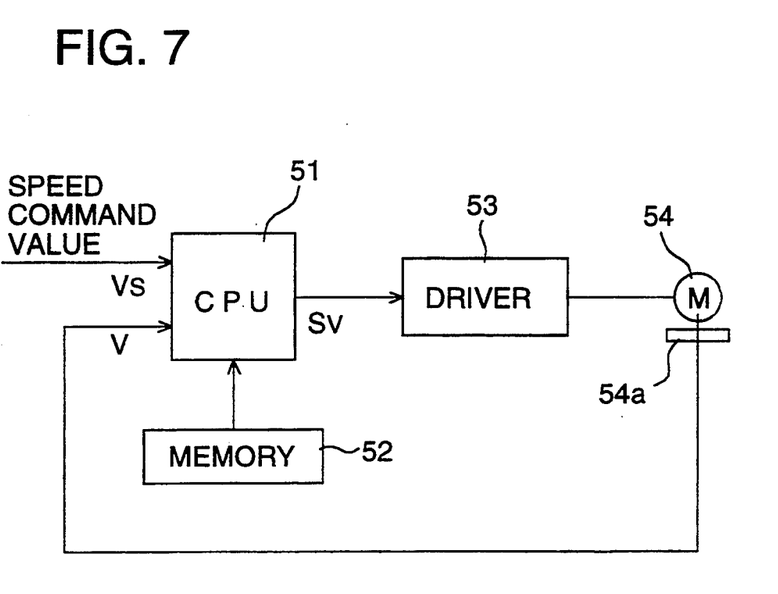
FIG. 7 is a block diagram of an electric circuit of an abnormal rotational speed detection device of a motor according to the present invention.

FIG. 7 is an example of a circuit in the case where a rotation speed abnormality detection device of a motor according to the present invention is applied to an electrophotographic copier.

Numeral 51 is a CPU which controls a series of electrophotographic processes according to a program stored in a memory 52, and conducts a speed control of a motor 54 by PWM (Pulse Width Modulation). Numeral 53 is a driver to drive the motor 54 according to a speed command signal $S_V$ outputted from the CPU 51. An equation 1, which will be described later, in which a PI action is used, and which calculates the speed command signal $S_V$ to control the rotation speed of the motor, is stored in the memory 52. The rotation speed of the motor 54 is detected by a rotary encoder 54a provided on the rotary shaft of the motor, and inputted into the CPU 51 as a rotation speed signal v. The speed control of the motor 54 is conducted by the PI action. That is, the speed command signal $S_V$ by PWM outputted from the CPU 51 is expressed by the next equation 1.

$$S_V = P(V_S - V) + I\Sigma(V_S - V) \quad \text{[Equation 1]}$$

Here, a method of consideration of the rotation speed abnormality detection of the motor according to the present invention will be described as follows.

Figure 8:
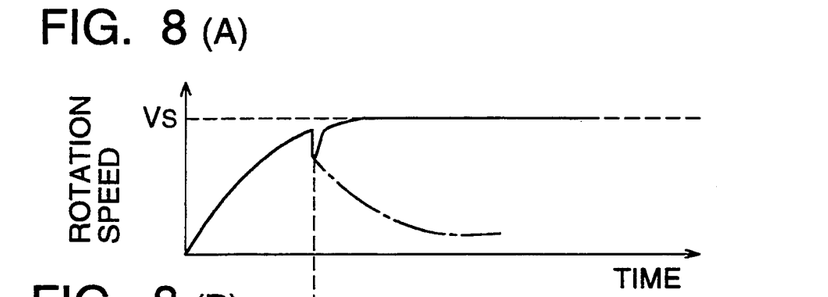
FIG. 8A shows a rotational speed of the motor.
FIG. 8B shows a proportional term of a speed command signal.
FIG. 8C shows variation of an integral term of the speed command signal.

When the rotation speed of the motor is controlled by the speed command signal $S_V$ expressed by Equation 1, a rotation speed V of the motor is gradually increased and approaches to a target rotation speed $V_S$, and therefore, a proportional term $P(V_S - V)$ of the speed command signal S is gradually decreased. On the contrary, an integral term $I\Sigma(V_S - V)$ is gradually increased and changes as shown in FIGS. 8A, 8B and 8C. FIG. 8A shows the rotation speed V of the motor, FIG. 8B shows the proportional term $P(V_S - V)$, and FIG. 8C shows the integral term $I\Sigma(V_S - V)$.

In this connection, when the rotation speed V of the motor is instantaneously decreased as shown in FIG. 8A, the proportional term shown in FIG. 8B is instantaneously increased at the time and the integral term shown in FIG. 8C is suddenly increased at the time. When the instantaneous variation of the rotation speed V of the motor shown in FIG. 8A is not caused by the above described clutch operation, the rotation speed V of the motor is returned to the original value just after the time. Accordingly, the proportional term is returned also to the original value, but the integral term is slightly increased from the increased value, or is not changed.

However, when the decrease of the rotation speed V of the motor is not instantaneous, but is caused by the abnormality of the motor and is continued as shown by a chain line in FIG. 8A, the proportional term and the integral term are considerably increased as shown by chain lines in FIGS. 8B and 8C. In this case, when an upper threshold value $U_1$ is previously set above the value of the integral term as shown in FIG. 8C, it can be judged that the speed of the motor is abnormal in the case where the value of the integral term is greater than the upper threshold value $U_1$.

Although the case has been described in which the rotation speed of the motor is greatly decreased, it is approximately the same case as the foregoing that the rotation speed of the motor is greatly increased. In this case, the lower threshold value $U_2$ is previously set and when the value of the integral term is lower than the lower threshold value $U_2$, it can be judged that the speed of the motor is abnormal.

Figure 9:
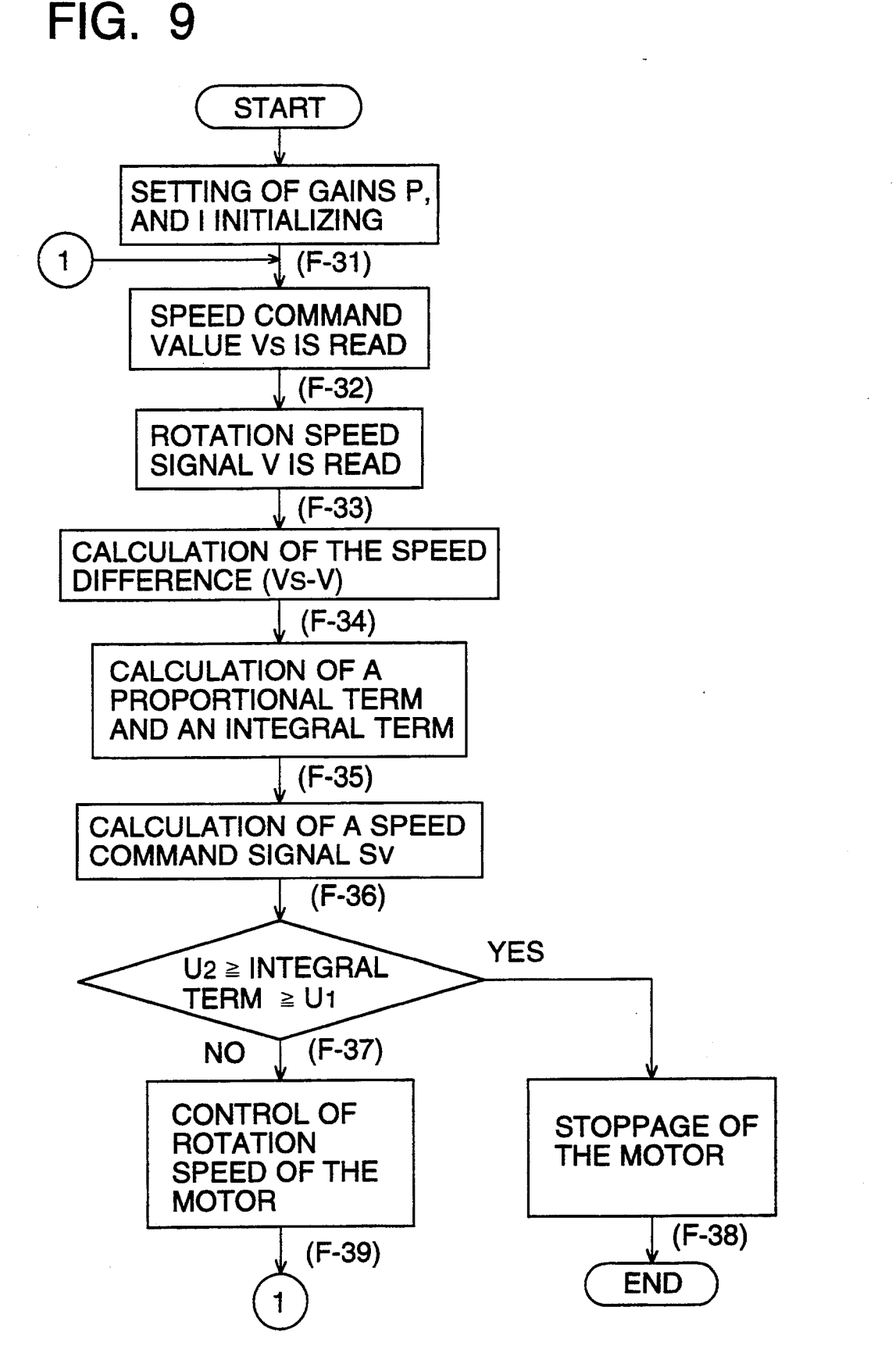
FIG. 9 is a flow chart of a detecting action of the abnormal speed of the motor according to the present invention.

Referring to the flow chart shown in FIG. 9, operations to detect the abnormality of the motor speed according to the present invention will be described as follows.

Detection operations are started when copying operations are started. At first, the CPU 51 sets a gain P of the proportional term and a gain I of the integral term of the calculation equation of the speed command signal $S_V$ stored in the memory 52, and initializes other data (F-31). Then, the CPU reads a predetermined speed command value (target rotation speed) $V_S$ in the sequence of copying operations (F-32), next, reads the rotation speed signal V sent from the rotary encoder 54a (F-33), and calculates the difference of the speed $(V_S - V)$ (F-34). Next, the CPU calculates the proportional term $P(V_S - V)$ and the integral term $I\Sigma(V_S - V)$ using the difference of the speed $(V_S - V)$ (F-35). The CPU calculates the speed command signal $S_V$ by PWM according to the Equation 1 from the proportional term and the integral term thus obtained (F-36). In this case, the integral term of the speed command signal $S_V$ is noted and it is judged whether the value of the integral term is greater than a predetermined upper threshold value $U_1$, or it is smaller than the lower threshold value $U_2$ (F-37). When the value of the integral term is greater than the value $U_1$, or when it is smaller than the value $U_2$, it is judged that the speed of the motor is abnormal, and then, the motor is stopped (F-38). However, when the condition of step (F-37) is not satisfied, it is judged that the speed of the motor is not abnormal. Then, the speed command signal $S_V$ obtained in step (F-36) is sent to the driver 53, and the rotation speed of the motor 54 is controlled (F-39). After that, the sequence is returned to step (F-32), and the foregoing operations are repeated.

As described above, because it is enough to simply judge the conditions of step (F-37) in order to judge whether the speed of the motor is abnormal or not, from the increase or decrease of the rotation speed of the motor, the abnormality of the motor can be instantaneously judged.

The upper threshold value $U_1$ and the lower threshold value $U_2$ to judge whether the speed of the motor is abnormal or not may be determined depending on the degree of the decrease or increase of the rotation speed of the motor caused by the sudden load variations in the normal operation.

As described above, according to the present invention, because it is judged that the rotation speed of the motor is abnormal when the value of the integral term of the speed command signal is greater than a predetermined upper threshold value, or it is lower than a predetermined lower threshold value, in the rotation speed control of the motor by the PI action, the abnormality of the speed of the motor can be instantaneously judged by a simple circuit structure without using circuit elements such as a counter or the like. Thereby, the succeeding responding operations such as a stop of the motor, the display of the fault alarm, or the like can be quickly conducted.

What is claimed is:

1. An electric circuit for a motor for use in a toner image forming apparatus, comprising:

a motor to rotate a photoreceptor on which a toner image is formed;

a power source circuit;

a driving circuit including, a connecting line to connect the power source circuit with the motor, and a switch to selectively open and close the connecting line;

the driving circuit further including:

an abnormal rotational speed detector for detecting an abnormal rotational speed of the motor and for outputting an abnormal rotational speed signal to a control means;

an abnormal section detecting circuit including: a current detector; a voltage detector; and a line connection checking circuit;

the abnormal section detecting circuit being connected to monitor the motor, the power source circuit, and the driving circuit so that a current, a voltage and a line connection at predetermined positions in the electric circuit are detected by said current detector, said voltage detector and said line current checking circuit; and the abnormal section detecting circuit providing an output signal to said control means that is indicative of a detection result of the monitoring by said abnormal section detecting circuit;

the control means controlling the abnormal section detecting circuit in accordance with a plurality of predetermined sequential checking steps after receipt of the abnormal rotational speed signal;

said control means further determining a location of an abnormal portion of the motor and the electric circuit causing the abnormal rotational speed of the motor on the basis of the output signal from the abnormal section detecting circuit.

2. The circuit of claim 1, wherein the first current detector detects a current in the power source circuit when the switch opens the connecting line, to enable the control means to check whether a grounding is occurring between the switch and the power source circuit.

3. The circuit of claim 1, wherein:

the switch of the driving circuit is provided on a driving circuit board; and a line connection checking circuit includes a test circuit provided on the driving circuit board, said line connection checking circuit circulating a test signal in the driving circuit board through the test circuit to enable the line connection checking circuit and the control means to check at a plurality of terminals on the driving circuit board whether a line connection exists.

4. The circuit of claim 1, wherein the abnormal section detecting circuit further includes a load detecting circuit for detecting a load of the power source circuit.

5. The circuit of claim 4, wherein the voltage detector detects a voltage of the power source circuit and the load detecting circuit detects a load of the power source circuit when the switch opens the connecting line to enable the control means to check whether a short circuit exists between the switch and the power source circuit.

6. The circuit of claim 4, wherein the voltage detector detects a voltage of the power source circuit and the load detecting circuit detects a load of the power source circuit when the switch closes the connecting line to enable the control means to check whether a short circuit exists in the motor.

7. The circuit of claim 1, wherein a fuse is provided for the connecting line and the voltage detector detects a voltage at a point between the fuse and the motor to enable the control means to check whether the fuse has burned out.

8. The circuit of claim 1, wherein the another current detector detects a current flowing through the motor when the switch closes the connecting line to enable the control means to check for a malfunction in the motor.

9. The circuit of claim 3, wherein:

the control means includes a control circuit which outputs a pulse signal to selectively open and close the switch to thereby control a flow of power to the motor whereby a rotational speed of the motor is controlled; and the switch is provided on the driving circuit board on which the line connection checking circuit circulates the pulse signal of the control circuit as the test signal; and the control means checks the circulated test signal to detect whether an abnormality exists in the pulse signal.

10. The circuit of claim 1, further comprising:

a rotation speed detector to detect a rotational speed of the motor; and a speed controller having a memory for storing a preset target speed and a preset control formula therein, said preset control formula including an integral term therein to provide a PI control operation wherein the speed controller provides a speed control signal based on the rotational speed detected by said rotational speed detector on the basis of the control formula; and said speed controller including a comparator for comparing a value of the integral term of the control formula with a value of one of an upper and a lower threshold value, and wherein, when a value in the integral term has one of a value which exceeds the upper threshold value and is lower than the lower threshold value, the controller determines that the rotational speed detected by said rotation speed detector is an abnormal rotational speed.

* * * * *